(12) United States Patent
Teng

(10) Patent No.: US 10,977,824 B2
(45) Date of Patent: Apr. 13, 2021

(54) POSITIONING METHOD AND POSITIONING SYSTEM

(71) Applicant: ACER INCORPORATED, New Taipei (TW)

(72) Inventor: Chia-Cheng Teng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 44 days.

(21) Appl. No.: 16/425,902

(22) Filed: May 29, 2019

(65) Prior Publication Data

US 2020/0118291 A1 Apr. 16, 2020

(30) Foreign Application Priority Data

Oct. 11, 2018 (TW) .................................. 107135674

(51) Int. Cl.
*G06K 9/00* (2006.01)
*G09G 5/00* (2006.01)
*G06T 7/73* (2017.01)

(52) U.S. Cl.
CPC ............ *G06T 7/74* (2017.01); *G06T 2200/28* (2013.01); *G06T 2207/20021* (2013.01); *G06T 2207/30181* (2013.01); *G06T 2207/30204* (2013.01)

(58) Field of Classification Search
USPC ....... 382/100, 103, 106, 116, 181, 190, 203, 382/209, 219, 254, 276, 286, 291, 285, 382/305; 345/156
See application file for complete search history.

(56) References Cited

U.S. PATENT DOCUMENTS

| | | | |
|---|---|---|---|
| 8,588,471 B2 * | 11/2013 | Hsieh ........................ | G06T 7/73 382/106 |
| 2011/0123135 A1 * | 5/2011 | Hsieh ................ | G06K 9/00664 382/285 |
| 2014/0022164 A1 * | 1/2014 | Adhikari ............... | G06F 3/0304 345/156 |
| 2015/0248762 A1 * | 9/2015 | Li ............................. | G06T 7/73 382/203 |
| 2016/0217543 A1 * | 7/2016 | Chao ...................... | G06Q 30/00 |
| 2018/0143317 A1 * | 5/2018 | Chen ........................ | G06T 7/74 |

FOREIGN PATENT DOCUMENTS

TW 201118794 A1 6/2011
TW M523862 U 6/2016

* cited by examiner

*Primary Examiner* — Seyed H Azarian
(74) *Attorney, Agent, or Firm* — Winston Hsu

(57) ABSTRACT

A positioning method and a positioning device are provided. The positioning method includes providing a map database, and obtaining a target image and querying the map database with the target image so as to determine a target coordinate corresponding to the target image.

6 Claims, 5 Drawing Sheets

| Mp_b | | |
|---|---|---|
| Mp 1 | Img_s1 | Coor_s1 |
| Mp 2 | Img_s2 | Coor_s2 |
| ⋮ | ⋮ | ⋮ |
| Mp n | Img_sn | Coor_sn |

FIG. 3

POSITIONING METHOD AND POSITIONING SYSTEM

BACKGROUND OF THE INVENTION

1. Field of the Invention

The present invention relates to a positioning method and a positioning system, and more particularly, to a positioning method and a positioning system capable of determining the user's current location by searching the map database based on the captured image.

2. Description of the Prior Art

There are essentially two types of conventional positioning techniques system: global positioning system (GPS) and light detection and ranging (LiDAR).

The GPS system needs to take some processing time for receiving enough satellite signals for processing in order to obtain the world coordinates of the target. Usually, the operation of receiving the satellite signals is time consuming, thus resulting in poor system efficiency and poor user experience. Moreover, a GPS measurement error at position may occur due to non-ideal factors such as the influence of the refraction of the atmosphere, the satellite clock synchronization error and the multipath effect caused by tall building. In addition, the LiDAR system needs to sense the terrain surface and its surrounding environment and compare to the terrain environments in the map database. Although, the LiDAR system can acquire high-precision world coordinates, the LiDAR system is quite expensive, thus increasing the overall cost of the system.

Therefore, how to overcome such drawbacks, and how to reduce hardware cost and perform a fast and high-precision positioning become an important topic of the field.

SUMMARY OF THE INVENTION

It is therefore an objective of the present invention to provide a positioning method and a positioning system capable of reducing hardware cost and quickly performing high-precision positioning.

The present invention discloses a positioning method, comprising: providing a map database; and obtaining a target image and querying the map database with the target image so as to determine a target coordinate corresponding to the target image.

The present invention further discloses a positioning system, comprising: a storage device, for storing a map database, wherein the map database includes a plurality of map files, each map file includes a sample image and a sample coordinate corresponding to the sample image; a first image capturing device, for capturing a target image; and an image comparison module, for querying the map database with the target image so as to determine a target coordinate corresponding to the target image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of a map database according to an embodiment of the present invention.

DETAILED DESCRIPTION

Figure 1:
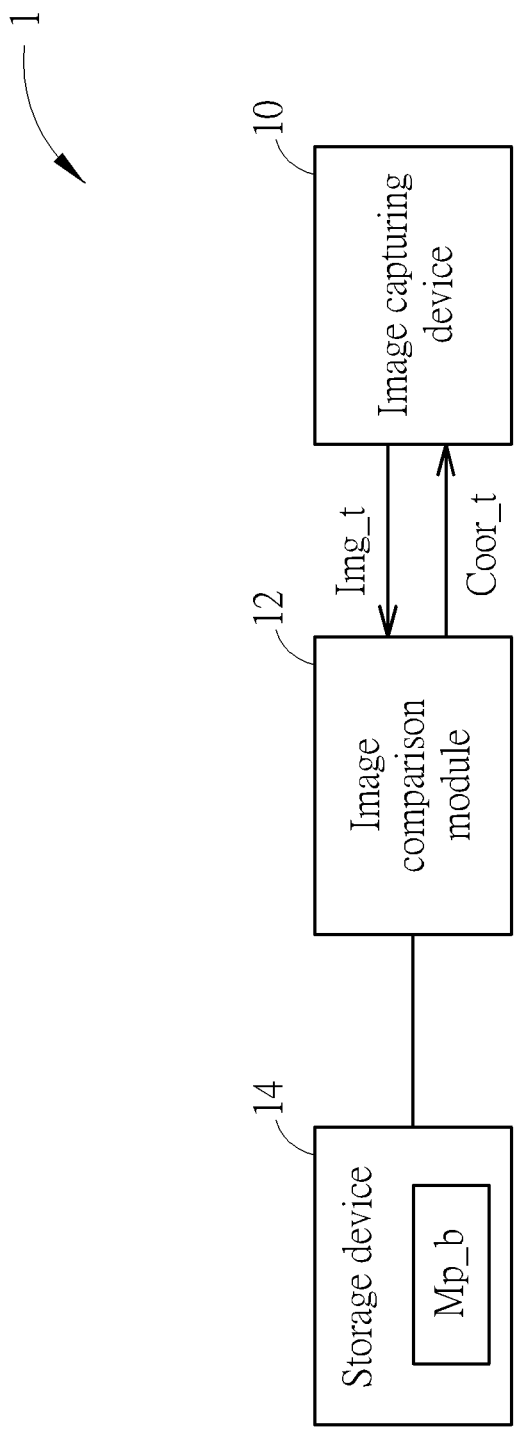
FIG. 1 is a schematic diagram of a positioning system according to a first embodiment of the present invention.

Please refer to FIG. 1, which is a schematic diagram of a positioning system 1 according to an embodiment of the present invention. The positioning system 1 can be utilized to capture an image at a user's current location and query a map database Mp_b stored with the captured image, so as to obtain a world coordinate of the user's current location. In other words, when a user wants to track where he or she is located, the user can only query the stored map database Mp_b to quickly determine the user's current location by using the positioning system 1 of the present invention, without using a global positioning system (GPS), thereby achieving the purpose of real time positioning and effectively improving the user experience.

As shown in FIG. 1, the positioning system 1 includes an image capturing device 10, an image comparison module 12 and a storage device 14. The image capturing device 10 can be utilized for capturing images by the user. The storage device 14 is utilized for storing map database Mp_b. The image comparison module 12 is coupled to the image capturing device 10 and the storage device 14. The image comparison module 12 is utilized for comparing the image captured by the image capturing device 10 with the images stored in the map database Mp_b so as to determine the current location of the user. In more detail, each sample image stored in the map database Mp_b corresponds to a position coordinate. The user can utilize the image comparison module 12 to compare an image Img_t captured by the image capturing device 10 with sample images stored in the map database Mp_b. After the sample image matching the image Img_t is found in the map database Mp_b, a corresponding position coordinate of the sample image matching the image Img_t is obtained and determined as the current location of the user. Note that, the image capturing device 10 can be a camera, a video camera, a dashboard camera (also called car recorder) or any other device which can capture the image Img_t by the user. In addition, the image capturing device 10 can be a separate and independent electronic device. Or, the image capturing device 10 can be integrated on a camera or a video camera of an electronic device. For example, the image capturing device 10 can be a camera disposed in a mobile phone or a portable electronic device, which is convenient for the user to carry around and facilitates the hardware compatibility of the positioning system 1. The image comparison module 12 is utilized for image matching according to the captured image Img_t. The image comparison module 12 can be a microprocessor (MCU), an application-specific integrated circuit (ASIC), a field programmable array (FPGA) or any other device capable of implementing the image matching functions. The storage device 14 may be a read-only memory (ROM), a random access memory (RAM), a CD-ROM, a magnetic tape, a floppy disk, an optical data storage device or a non-volatile memory (e.g., an electrically erasable programmable read-only memory (EEPRM), a flash memory), but not limited thereto.

Figure 2:
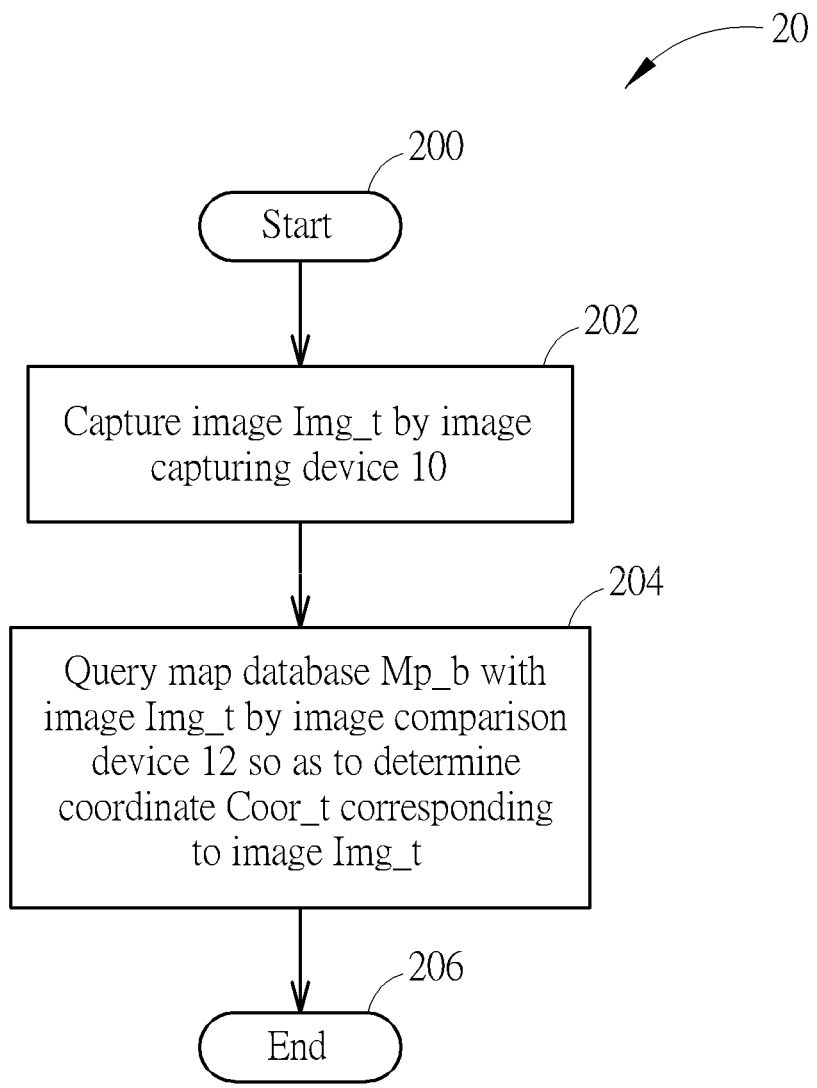
FIG. 2 is a schematic diagram of a procedure according to an embodiment of the present invention.

Regarding operations of the positioning system 1, a positioning method of the positioning system 1 may be summarized in an exemplary procedure 20. Please refer to FIG. 2, which is a schematic diagram of the procedure 20 according to an embodiment of the present invention. The procedure 20 includes the following steps:

Step 200: Start.

Step 202: Capture image Img_t by image capturing device 10.

Step 204: Query map database Mp_b with image Img_t by image comparison device 12 so as to determine coordinate Coor_t corresponding to image Img_t.

Step 206: End

According to the procedure 20, in Step 202, the image capturing device 10 captures an image Img_t and transmits the image Img_t to the image comparison module 12. In Step 204, the image comparison module 12 compares the image Img_t with the map database Mp_b so as to obtain the user's current location (i.e. the coordinate Coor_t corresponding to the image Img_t).

Moreover, please refer to FIG. 3, which is a schematic diagram of a map database Mp_b according to an embodiment of the present invention. As shown in FIG. 3, the map database Mp_b includes map files Mp1-Mpn. Each map file includes a sample image and a sample coordinate corresponding to the sample image. For example, the map file Mp1 includes a sample image Img_s1 and a sample coordinate Coor_s1 corresponding to the sample image Img_s1. The map file Mp2 includes a sample image Img_s2 and a sample coordinate Coor_s2 corresponding to the sample image Img_s2. The map file Mp3 includes a sample image Img_s3 and a sample coordinate Coor_s3 corresponding to the sample image Img_s3. The map file Mp4 includes a sample image Img_s4 and a sample coordinate Coor_s4 corresponding to the sample image Img_s4, and so on. As such, in Step S204, the image comparison module 12 can extract and analyze image features of the image Img_t and compare the image features of the image Img_t with the sample images Img_s1-Img_sn of the map files Mp1-Mpn, so as to determine a sample image that best matches the image Img_t from the sample images Img_s1-Img_sn of the map files Mp1-Mpn. The sample image that best matches the image Img_t is determined as the matching sample image. The sample coordinate corresponding to the matching sample image is determined as the coordinate Coor_t of the image Img_t. In other words, the image comparison module 12 compares the image Img_t with the sample images Img_s1-Img_sn of the map files Mp1-Mpn to determine the sample image matching the image Img_t from sample images Img_s1-Img_sn, and determines the sample coordinate of the sample image matching the image Img_t as the coordinate Coor_t of the image Img_t. Preferably, the image comparison module 12 can adjust the comparison conditions associated with the image Img_t to meet the user's requirements. For example, when the degree of conformity with the image Img_t exceeds a preset value, the image comparison module 12 determines the sample image best matching the image Img_t as the matching sample image and outputs the sample coordinate of the matching sample image as the coordinate Coor_t of the image Img_t.

In an embodiment, a driver can use the positioning system 1 to get and track the current location or position of a vehicle in real time while driving the vehicle. Note that, the positioning system 1 queries the map database Mp_b to find the sample image matching the image Img_t. Under such a situation, the positioning system 1 can accurately and quickly generate the coordinate Coor_t to determine the current location of the user without the need to connect to a GPS system for determining the current location. In other words, the positioning system 1 does not need to connect to a GPS system to perform a lengthy GPS positioning process. Instead, the positioning system 1 can quickly determine the current location through searching the sample image in the map gallery Mp_b, thus increasing the operating speed of the positioning and improving the user experience.

On the other hand, the map files Mp1-Mpn of the map database Mp_b can, preferably, be classified by using various data classification methods for database Mp_b. Since the map files Mp1-Mpn of the map database Mp_b are classified, the sample image best matching the image Img_t may be found quickly to generate the coordinate Coor_t while querying the map database Mp_b for searching and comparing the sample images Img_s1-Img_sn of the map files Mp1-Mpn. For example, regarding the classification method of the map database Mp_b, each of the sample images Img_s1-Img_sn can be analyzed to extract image features in advance. The sample images Img_s1-Img_sn can be classified according to the image features of the sample images. For example, the sample images with identical or similar image features can be categorized into similar types, such that the processing efficiency can be effectively improved when querying the map database Mp_b. For example, regarding the classification method of the map database Mp_b, each sample image can be classified according to the number of times that the each sample image is queried or the number of times that the each sample image is determined as the user's current location. The sample images that are frequently queried by the user are classified as high priority, and the sample images that are less queried by the user are classified as low priority. The sample images that are frequently determined as the user's current location are classified as high priority. The sample images that are less determined as the user's current location are classified as low priority. As such, the sample images with high priority be queried at first. For example, the sample image Img_s1 corresponds to the sample coordinate Coor_s1. The sample image Img_s2 corresponds to the sample coordinate Coor_s2. The sample image Img_s3 corresponds to the sample coordinate Coor_s3. The sample image Img_s4 corresponds to the sample coordinate Coor_s4. For example, during image comparison, when determining that the sample image Img_s1 matches the image Img_t, the corresponding position coordinate Coor_s1 of the sample image s1 matching the image Img_t may be obtained and selected as the current location of the user. That is, the sample image Img_s1 is queried and selected as the user's current location once and the like. For example, before comparing the image Img_t with the sample images, the sample image Img_s1 has been queried and selected as the user's current location twice, the sample image Img_s2 has been queried and selected as the user's current location one thousand times, the sample image Img_s3 has been queried and selected as the user's current location seven hundred times, and the sample image Img_s4 has been queried and selected as the user's current location twenty times. Under such a situation, if a threshold value is set to be fifty times. When the number of times that a sample image has been selected as a matching sample image and the corresponding sample coordinate of the matching sample image has been determined as the target coordinate is smaller than or equal to the threshold value, the sample image may be classified as a sample image with low priority. When the number of times that a sample image has been selected as a matching sample image and the corresponding sample coordinate of the matching sample image has been determined as the target coordinate is greater than the threshold value, the sample image may be classified as a sample image with high priority. For example, the number of times that the sample coordinate sample of the image Img_s1 that has been selected the target coordinate (i.e. twice) is smaller than fifty times, and the sample image Img_s1 t may be classified as a sample image with low priority. The number of times that the sample coordinate sample of sample image Img_s2 that has been selected the target coordinate (i.e. one thousand times) is greater than fifty times, and the sample image Img_s2 may be classified as a sample image with high priority. The number of times that the sample coordinate sample of the sample image Img_s3 that has been selected the target coordinate (i.e. seven hundred times) is greater than fifty times, and the sample image Img_s3 may be classified as a sample image with high priority. The number of times that the sample coordinate sample of the sample image Img_s4 that has been selected the target coordinate (i.e. twenty times) is smaller than fifty times, and the sample image Img_s4 t may be classified as a sample image with low priority. Therefore, the sample images Img_s1 and Img_s4 that have been less queried and selected may be classified as sample images with high priority. The sample images Img_s2 and Img_s3 that have been frequently queried and selected (e.g., one thousand times, seven hundred times) may be classified as sample images with high priority. Therefore, in Step 204, the image Img_t may be compared with the sample images with high priority (i.e. the sample images Img_s2, Img_s3) at first. Further, if the sample images with high priority (the sample images Img_s2, Img_s3) do not match the image Img_t, the image Img_t may be compared with the sample images with low priority (i.e. the sample image Img_s1, Img_s4). Such like this, when querying the map database Mp_b, the sample image that best matches the image Img_t may be fast found and selected from the sample images Img_s1-Img_sn in the map database Mp_b, thus improving the processing efficiency. In addition, based on various applications and design concepts, the map files Mp1-Mpn of the map database Mp_b can also be classified according to various classification tree methods for improving the processing efficiency of the positioning system 1.

In other words, the positioning system 1 of the invention provides the user to capture the image Img_t on the user's current location and accordingly compare the sample image Img_s1 in the map database Mp_b. Therefore, the sample coordinate of the sample image matching the image Img_t can be determined as the coordinate Coor_t of the image Img_t to show the user's current location. Therefore, the positioning system 1 of the invention can determine the user's current location or position in real time by querying the map database Mp_b instead of connecting to the GPS system for determining the current location, thereby increasing the positioning operation speed of the positioning system 1 and improving the user experience.

Figure 4:
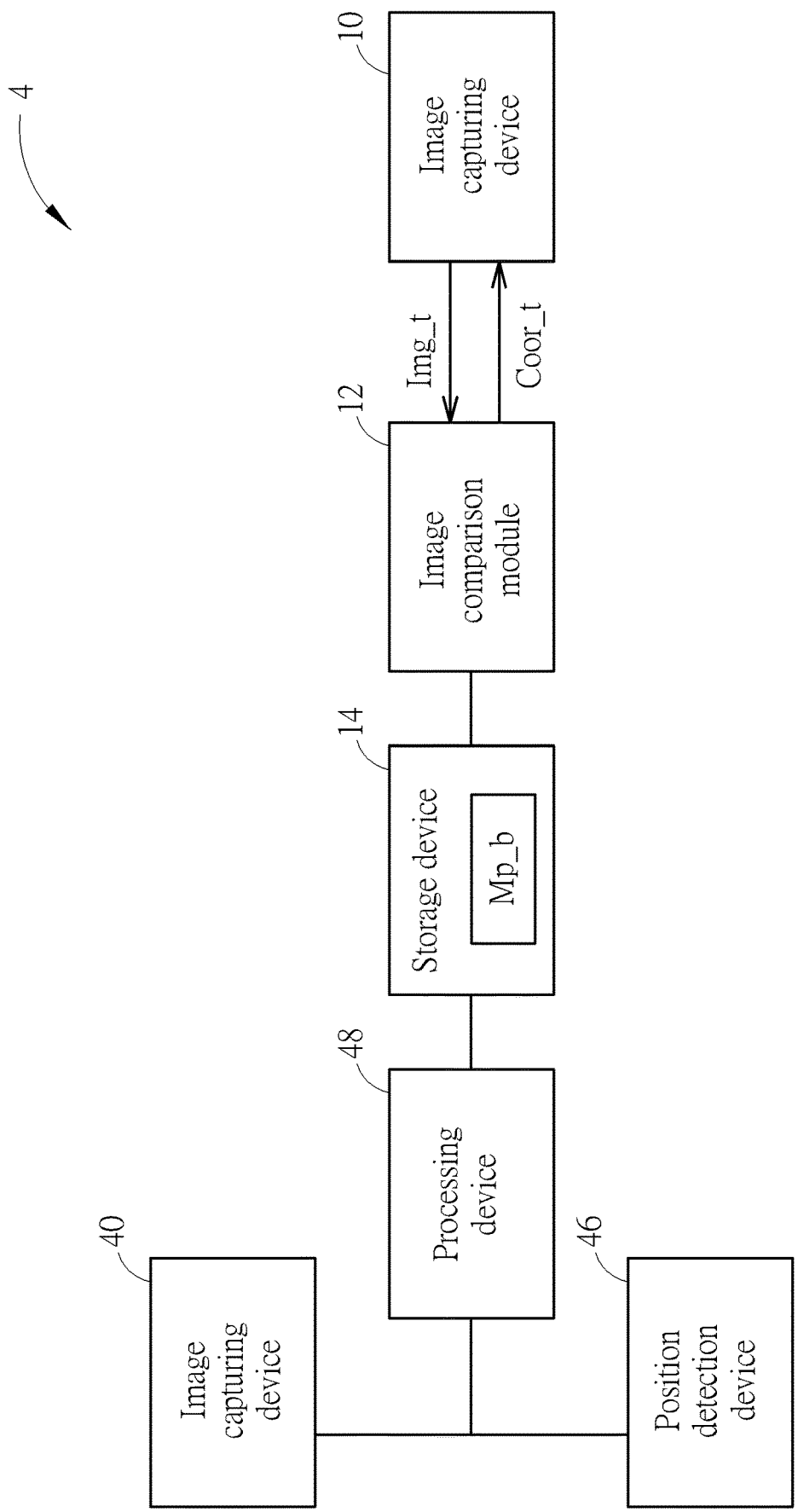
FIG. 4 is a schematic diagram of a positioning system according to a second embodiment of the present invention.

Moreover, please refer to FIG. 4, which is a schematic diagram of a positioning system 4 according to an embodiment of the present invention. The positioning system 4 is similar to the positioning system 1 shown in FIG. 1. Please note that the units in the positioning system 4 shown in FIG. 4 with the same designations as those in the positioning system 1 shown in FIG. 1 have similar operations and functions, further description is omitted for brevity. The positioning system 4 further includes an image capturing device 40, a position detection device 46 and a processing device 48. The image capturing device 40, the position detection device 46 and the processing device 48 can be utilized for generating the map database Mp_b.

In detail, similar to the image capturing device 10, the image capturing device 40 is utilized for capturing sample images. The position detection device 46 is utilized for obtaining the sample coordinates corresponding to the sample images. The processing device 48 is coupled to the image capturing device 40 and the position detection device 46 for saving each sample image and the corresponding sample coordinate into a respective image file and transmitting the image file to the storage device 40 to establish the map database Mp_b. The image capturing device 40 can be a camera, a video camera, a dashboard camera or any other device which can capture images. The image capturing device 40 can be integrated in an electronic device. The position detection device 46 can be a GPS device, a real-time kinematic system device or any other device which can accurately determine the coordinate of the current location or position.

According to various applications and design concepts, the position detection device 46 can selectively utilize a GPS device or a real-time kinematic system device for positioning and locating while establishing the map database Mp_b. For example, as the position detection device 46 is a real-time kinematic system device, the position detection device 46 can perform a precise positioning to avoid the influence of the refraction of the atmosphere, the satellite clock synchronization error or the multipath effect caused by tall building. Therefore, the positioning system 4 can reach the millimeter accuracy level for providing accurate sample coordinates.

Moreover, the positioning system 4 can obtain sample images and corresponding sample coordinates through the image capturing device 40 and the position detection device 46 according to different rules or determination methods while establishing the map database Mp_b. For example, the image capturing device 40 continuously captures images and the processing device 48 obtains the sample image and the corresponding sample coordinates based on a fixed interval time or a fixed interval position accordingly. After that, the corresponding map files can be stored in the storage device 14. For example, please further refer to FIG. 3 and FIG. 4. During a first time period, the image capturing device 40 captures a sample image Img_s1 and the position detection device 46 detects a sample coordinate Coor_s1. The sample image Img_s1 and the sample coordinate Coor_s1 corresponding to the sample image Img_s1 can be stored as a map file Mp1 by the processing device 48. During a second time period, the image capturing device 40 captures a sample image Img_s2 and the position detection device 46 detects a sample coordinate Coor_s2. The sample image Img_s2 and the sample coordinate Coor_s2 corresponding to the sample image Img_s2 can be stored as a map file Mp2 by the processing device 48, and so on.

In brief, the positioning system 4 of the invention can obtain accurate sample coordinates while establishing the map database Mp_b. Therefore, when the user wants to query about the user's current location, the user only needs to use the positioning system 4 to capture the image Img_t and query the map database Mp_b with the image Img_t, such that the coordinate Coor_t of the user's current location can be obtained without using a GPS system.

Figure 5:
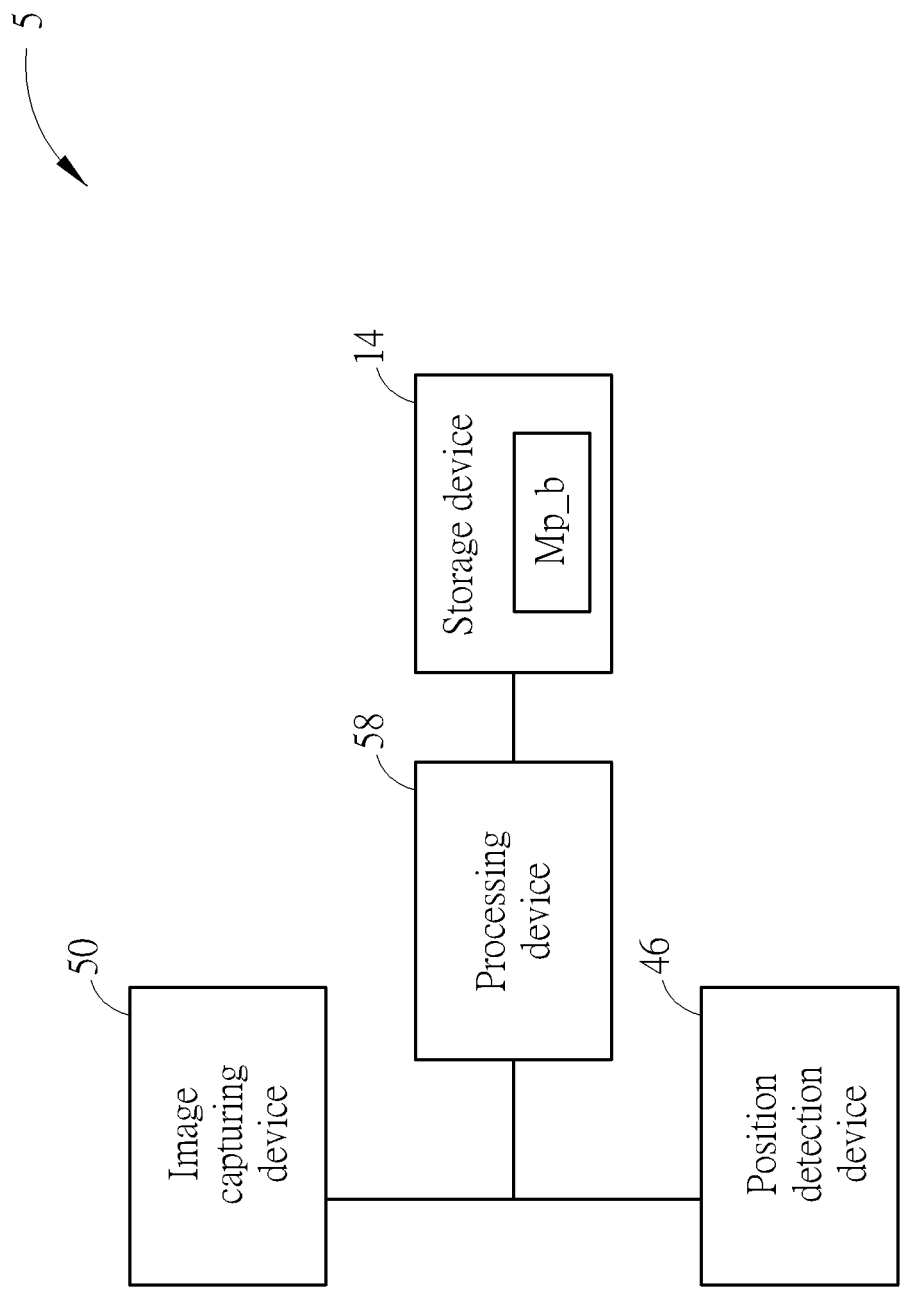
FIG. 5 is a schematic diagram of a positioning system according to a third embodiment of the present invention.

Note that, the above-mentioned positioning systems are exemplary embodiments of the present invention, and those skilled in the art can make alternations and modifications accordingly. For example, please refer to FIG. 5, which is a schematic diagram of a positioning system 5 according to an embodiment of the present invention. The positioning system 5 is similar to the positioning system 4 shown in FIG. 4. The units in the positioning system 5 shown in FIG. 5 with the same designations as those in the positioning system 4 shown in FIG. 4 have similar operations and functions, and further description is omitted for brevity. Note that, the positioning system 5 includes an image capturing device 50. The positioning system 5 further includes a processing device 58 which integrates the functions of the image matching module and the process device. The image capturing device 50 is coupled to the processing device 58. The image capturing device 50 captures an image Img_t and transmits the image Img_t to the processing device 58 for image comparison when the user wants to query about the user's current location. In addition, the user can utilize the image capturing device 50 to capture sample images to generate the map files for creating the map database Mp_b. The positioning system 5 can only utilize one image capturing device and also has the functions of establishing the map database Mp_b and querying the current location so as to reduce the hardware cost.

When the positioning system 5 only utilizes the capturing device 50 and the user utilizes the positioning system 5 to query about the current location, the capturing device 50 captures the image Img_t transmitted to the processing device 58. The processing device 58 compares the image Img_t with the map database Mp_b to determine the user's current location. When there is no sample image matching the image Img_t, the positioning system 5 enables the position detection device 46 to detect a coordinate Coor_t of the image Img_t. The processing device 58 integrates the image Img_t and the coordinate Coor_t to a map file and stores the map file into the storage device 14 for updating the map database Mp_b. In other words, the positioning system 5 can quickly and accurately determine the coordinates of the current location Coor_t by searching the matching sample image in the map database Mp_b. Moreover, the positioning system 5 can update the map database Mp_b by using the position detection device 46 and the processing device 58 when there is no matching sample image is found in the map database Mp_b. In brief, the positioning system 5 can not only provide accurate determination of the current location, but also provide new map file to expand the map database Mp_b.

The conventional GPS system needs long processing time for receiving enough satellite signals. The conventional LiDAR system is quite expensive. In comparison, the positioning system of the invention can quickly determine the user's current location by comparing the image with the map database without receiving satellite signals, thus reducing hardware cost, providing fact and high-precision positioning and improving the user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A positioning method for a positioning system, the positioning system comprising a camera, a processor and a storage device coupled to the processor, the positioning method comprising:

capturing, by the camera, a target image and transmitting, by the camera, the target image to the processor;

providing, by the storage device, a map database including a plurality of sample images, wherein each sample image has a corresponding sample coordinate;

executing, by the processor, instructions stored in the storage device, wherein the instructions comprise:

classifying the plurality of sample images of the map database into sample images with high priority and sample images with low priority according to the number of times that each sample image has been queried and determined as a matching sample image and the corresponding sample coordinate of the matching sample image has been determined as a selected target coordinate, wherein the number of times that the corresponding sample coordinate of the sample image with high priority that has been determined as the selected target coordinate is greater than a threshold value, the number of times that the corresponding sample coordinate of the sample image with low priority that has been determined as the selected target coordinate is smaller than or equal to the threshold value; and receiving the target image from the camera; and querying the map database with the target image so as to determine a target coordinate corresponding to the target image, comprising:

comparing the target image with the sample images with high priority in the map database and comparing the target image with the sample images with low priority in the map database so as to determine a sample image matching the target image in the plurality of sample images;

obtaining the sample coordinate corresponding to the determined sample image matching the target image and determining the sample coordinate as the target coordinate corresponding to the target image.

2. The positioning method of claim 1, wherein the step of providing, by the storage device, the map database including a plurality of sample images comprises:

obtaining, by the camera, the plurality of sample images and sensing, by a position detection device, a sample coordinate corresponding to each sample image; and storing, by the storage device, the plurality of sample images and a plurality of sensing sample coordinates corresponding to the plurality of sample images into the map database.

3. The positioning method of claim 1, wherein the step of comparing the target image with the sample images with high priority in the map database and comparing the target image with the sample images with low priority in the map database so as to determine the sample image matching the target image in the plurality of sample images comprises:

extracting at least one image feature of the target image; and comparing the at least one image feature with the sample images with high priority of the map database and comparing the at least one image feature with the sample images with low priority of the map database so as to obtain the sample image matching the target image.

4. A positioning system, comprising:

a storage device, for storing a map database, wherein the map database includes a plurality of map files, each map file includes a sample image and a sample coordinate corresponding to the sample image;

a first camera, for capturing a target image; and a processor configured to execute instructions stored in the storage device, wherein the instructions comprise:

classifying the plurality of sample images of the map database into sample images with high priority and sample images with low priority according to the number of times that each sample image has been queried and determined as a matching sample image and the corresponding sample coordinate of the matching sample image has been determined as a selected target coordinate, wherein the number of times that the corresponding sample coordinate of the sample image with high priority that has been determined as the selected target coordinate is greater than a threshold value, the number of times that the corresponding sample coordinate of the sample image with low priority that has been determined as the selected target coordinate is smaller than or equal to the threshold value; and receiving the target image from the camera; and querying the map database with the target image so as to determine a target coordinate corresponding to the target image, comprising:

comparing the target image with the sample images with high priority in the map database and comparing the target image with the sample images with low priority in the map database so as to determine a sample image matching the target image in the plurality of sample images;

obtaining the sample coordinate corresponding to the determined sample image matching the target image and determining the sample coordinate as the target coordinate corresponding to the target image.

5. The positioning device of claim 4, further comprising:
a second camera, for capturing a sample image;
a position detection device, for detecting a sample coordinate corresponding to the sample image captured by the second camera; and
a processing device, for storing the sample image and the sample coordinate corresponding to the sample image as a map file and storing the map file into the map database.

6. The positioning device of claim 4, wherein the instruction of comparing the target image with the sample images with high priority in the map database and comparing the target image with the sample images with low priority in the map database so as to determine the sample image matching the target image in the plurality of sample images comprises:

extracting at least one image feature of the target image and comparing the at least one image feature with the plurality of sample images with high priority of the map database and comparing the at least one image feature with the plurality of sample images with low priority of the map database so as to obtain the sample image matching the target image.

* * * * *